(12) United States Patent
Zhao (10) Patent No.: US 10,091,283 B2
(45) Date of Patent: Oct. 2, 2018

(54) DISTRIBUTED SCHEDULING SYSTEMS FOR DIGITAL MAGAZINE

(71) Applicant: Flipboard, Inc., Palo Alto, CA (US)

(72) Inventor: Howard Zhao, Palo Alto, CA (US)

(73) Assignee: Flipboard, Inc., Palo Alto, CA (US)

( * ) Notice: Subject to any disclaimer, the term of this patent is extended or adjusted under 35 U.S.C. 154(b) by 260 days.

(21) Appl. No.: 15/060,496

(22) Filed: Mar. 3, 2016

(65) Prior Publication Data

US 2017/0257431 A1    Sep. 7, 2017

(51) Int. Cl.
*G06F 15/16*    (2006.01)
*H04L 29/08*    (2006.01)
*H04L 12/26*    (2006.01)

(52) U.S. Cl.
CPC .......... *H04L 67/1014* (2013.01); *H04L 43/10* (2013.01); *H04L 67/1029* (2013.01); *H04L 67/1034* (2013.01)

(58) Field of Classification Search
CPC ............ H04L 67/1014; H04L 67/1029; H04L 67/1034; H04L 43/10
USPC .......................................... 709/201–203, 205
See application file for complete search history.

(56) References Cited

U.S. PATENT DOCUMENTS

| 9,459,933 | B1* | 10/2016 | Halim | ........................ G06F 9/52 |
| 2014/0372810 | A1* | 12/2014 | Na | ....................... G06F 11/3433 |
| | | | | 714/47.1 |
| 2015/0049093 | A1* | 2/2015 | Doll | ........................ G06T 13/80 |
| | | | | 345/473 |

* cited by examiner

*Primary Examiner* — Alicia Baturay
*Assistant Examiner* — Joseph Maniwang
(74) *Attorney, Agent, or Firm* — Fenwick & West LLP (57) ABSTRACT

A distributed scheduling system is provided for scheduling tasks of providing content items in a digital magazine and verifying completion of tasks performed in a dynamic and scalable way. The distributed scheduling system includes multiple execution devices for executing tasks for generating and presenting the digital magazine, and multiple task service devices for verifying completion of tasks performed by the execution devices. Each of the execution devices and task service devices generates a heartbeat indicating the operation status of the device for executing a corresponding task. A heartbeat is an electric representation generated by the device to indicate the operation status of the device (e.g., operable/functional or inoperable/down). Each task may be associated with a corresponding one of the task service devices, and each task service device may verify completion of its associated tasks.

20 Claims, 9 Drawing Sheets

DISTRIBUTED SCHEDULING SYSTEMS FOR DIGITAL MAGAZINE

BACKGROUND

The disclosure generally relates to the field of task management in distributed computing systems, and more specifically to dynamic and scalable distribution of tasks and verification of task completion in a digital magazine system.

A digital magazine application for a client device (e.g., a mobile communication device, tablet, computer, or any other suitable computing system) provides a personalized, customizable digital magazine for a user. The digital magazine application retrieves a compilation of content items (e.g., text, images, audio, links, videos, interactive media such as games, etc.) from a digital magazine server.

The digital magazine server obtains different content items from different source devices and compiles the content items into a format customized to the user. The digital magazine server includes (or is operatively coupled to) execution devices, which are configured to retrieve one or more content items, and a scheduling device for distributing and managing tasks among the execution devices. For example, the scheduling device assigns, to a first execution device, a task of retrieving news articles from a Wall Street Journal® server daily, and assigns, to a second execution device, a task of retrieving RSS feed from a social network server every 15 minutes. However, reliance on the single scheduling device exposes the digital magazine server to a single point of failure. Specifically, the digital magazine server may not be able to provide updated content items to the client device, in case the scheduling device or any execution device becomes inoperable. Furthermore, a digital magazine server is often configured to support many digital magazine applications running in parallel on thousands or even millions of client devices. Lack of scalable and dynamic scheduling and distribution of tasks for supporting digital magazine applications degrades user experience with digital magazine applications.

SUMMARY

One embodiment of a disclosed configuration is a system (or a computer implemented method or a non-transitory computer readable medium) for scheduling tasks and verifying completion of tasks performed through a distributed scheduling system for providing content items in a digital magazine. The distributed scheduling system includes multiple execution devices for executing tasks, for generating and presenting a digital magazine, and task service devices for verifying completion of tasks performed by the execution devices. Each task is associated with a corresponding one of the task service devices, and each task service device verifies completion of its associated tasks.

Each of the execution devices and task service devices generates a heartbeat indicating an operation status of the device for executing a corresponding task. A heartbeat is an electric representation generated by the device to indicate the operation status and/or communication status of the device (e.g., operable/functional or inoperable/down).

In one embodiment, each of the execution devices generates a device heartbeat indicating its operation status. In case an execution device is determined to be inoperable based on the status of the device's heartbeat, tasks assigned to the inoperable execution device are re-assigned to one or more of the remaining operable execution devices. Thus, a task assigned to any inoperable execution device can be performed by one or more remaining operable execution devices.

Similarly, each task service device generates its own heartbeat indicating the operation status of the task service device. In case a task service device is determined to be inoperable based on the status of its heartbeat, tasks previously associated with the inoperable task service device are re-associated with one or more of the remaining operable task service devices. Accordingly, completion of tasks previously associated with the inoperable task service device can be verified by the re-associated task service devices.

DETAILED DESCRIPTION

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

Example Digital Magazine System Environment

Figure 1:
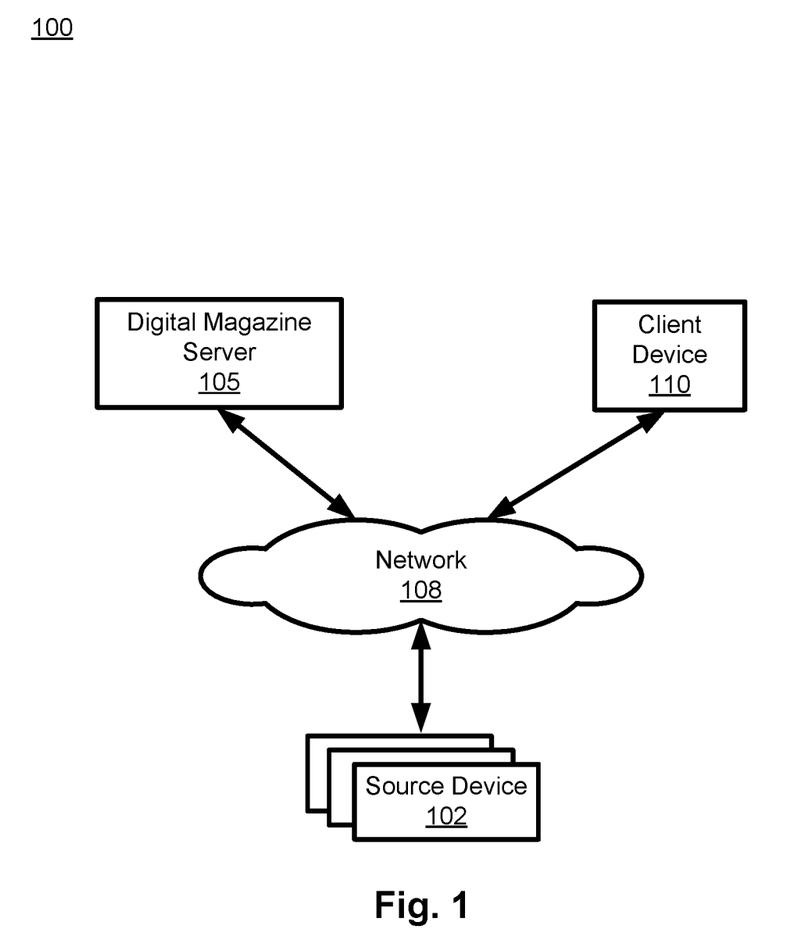
FIG. 1 is a block diagram of a system environment for organizing and sharing content items via a digital magazine according to one embodiment.

FIG. 1 is a block diagram of a system environment 100 for organizing and presenting content items via a digital magazine to a user of the digital magazine according to one embodiment. A "digital magazine" herein refers to an aggregation of digital content items that can be presented to users in a presentable format similar to the format used by print magazines. A "content item" or "article" herein refers to any machine-readable and machine-storable work product, such as textual articles, pictures/images, videos, user-generated content (e.g., content posted on a social networking system), advertisements, and any other types of digital content capable of display within the context of a digital magazine. The system environment 100 shown in FIG. 1 includes one or more source devices 102, a network 108, a client device 110, and a digital magazine server 105. In alternative embodiments, different and/or additional components may be included in the system environment 100.

A source device 102 is a computing system capable of providing various types of content to a client device 110. Examples of content provided by a source device 102 include text, images, video, or audio on web pages, web feeds, social networking information, messages, or other suitable data. Additional examples of content include user-generated content such as blogs, tweets, shared images, video or audio, social networking posts, and social networking status updates. Content (e.g., stories about news events, product information, entertainment, or educational material) provided by a source device 102 may be received from a publisher and distributed by the source device 102. For convenience, content from a source device, regardless of its composition, may be referred to herein as an "article," a "content item," or as "content." A content item may include various types of content, such as text, images, and video.

The source devices 102, the digital magazine server 105 and the client device 110 communicate among each other through the network 108. The network 108 may comprise any combination of local area and/or wide area networks, using both wired and/or wireless communication systems. In one embodiment, the network 108 uses standard communications technologies and/or protocols. For example, the network 108 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 108 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 108 may be represented using any suitable format, such as hypertext markup language (HTML) or extensible markup language (XML). In some embodiments, all or some of the communication links of the network 108 may be encrypted using any suitable technique or techniques.

The client device 110 is a computing device capable of receiving user input as well as transmitting and/or receiving data via the network 108. In one embodiment, the client device 110 is a conventional computer system, such as a desktop or a laptop computer. Alternatively, the client device 110 may be a device having computer functionality, such as a personal digital assistant (PDA), a mobile telephone, a smartphone or another suitable device. In one embodiment, the client device 110 executes a program (or an application) allowing a user of the client device 110 to interact with the digital magazine server 105 through the network 108. For example, an application executing on the client device 110 communicates instructions or requests for content items to the digital magazine server 105 to modify content presented to a user of the client device 110. As another example, the client device 110 executes a browser that receives pages from the digital magazine server 105 and presents the pages to a user of the client device 110. While FIG. 1 shows a single client device 110 for simplicity, in various embodiments, any number of client devices 110 may communicate with the digital magazine server 105.

The digital magazine server 105 receives a request to perform a task (herein also referred to as a "task request") from the client device 110 and executes the task. A task herein refers to an operation involved in retrieving one or more content items and generating one or more content pages of a digital magazine. In one example, a task request specifies task requirements such as client identification (ID) of a client device 110 requesting the task, a type of task (e.g., data retrieval, or internal processing), a source device, time requirement (e.g., estimated time of arrival (ETA), which is the date and time the task is to be executed by), frequency (e.g., every 12 hours), etc. To perform tasks requested by multiple client devices 110, the digital magazine server 105 distributes the tasks to one or more execution devices of the digital magazine server 105, monitors the operation status of the execution devices, generates the content pages of a digital magazine, and transmits the content pages to the client device 110, by which the digital magazine comprising the content pages is presented to the user of the client device 110. For example, the client device 110 requests the digital magazine server 105 to update content from a particular source device 102 periodically, and the digital magazine server 105 distributes the requests to one or more of its execution devices, by which the requested content is retrieved, and provides the updated content to the client device 110.

Figure 2:
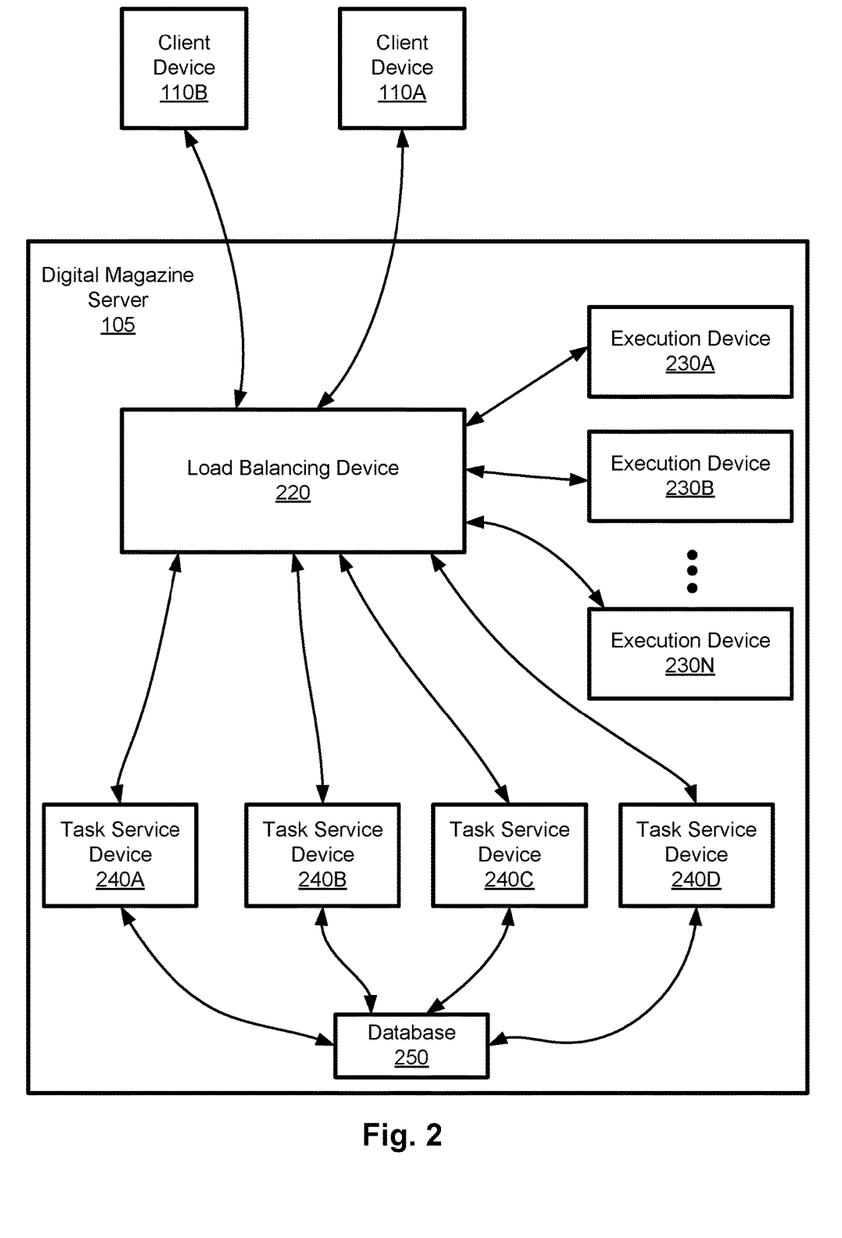
FIG. 2 is an example of a digital magazine server according to one embodiment.

FIG. 2 is a block diagram illustrating a digital magazine server 105 according to one embodiment. In one embodiment, the digital magazine server 105 includes a load balancing device 220, execution devices 230A through 230N, (generally referred to as an "execution device 230"), task service devices 240A through 240D (generally referred to as a "task service device 240"), and a database 250. These components operate together to execute tasks for generating content pages according to selected page layouts and transmit the generated content pages to the client device 110 for presentation. In other embodiments, the digital magazine server 105 may include different, fewer, or additional components.

In one embodiment, the digital magazine server 105 performs task assignment and verification of task completion in a distributed manner through the load balancing device 220. The load balancing device 220 receives task requests from the client devices 110, and forwards the task requests to the task service devices 240. Meanwhile, execution devices transmit requests for task assignments to the task service devices 240 through the load balancing device 220, and the task service devices 240 assign tasks to the execution devices in response to the requests for the task assignments. The task service devices 240 store a list of tasks to be performed and assignment of the execution devices 230 at the database 250. Each execution device 230 executes its assigned task, and each task service devices 240 confirms statuses of its associated tasks.

Each execution device 230 generates a heartbeat indicating an operation status of itself. Each task can be verified by one of the task service devices 240 associated with the task. Each task service device 240 also generates a heartbeat indicating the operation status of the task service device 240. The heartbeats of the execution devices 230 and the heartbeats of the task service devices 240 are monitored by the task service devices 240 to confirm operation statuses of the execution devices 230 and the task service devices 240. In response to a detection of an inoperable device, tasks assigned to the inoperable device can be reassigned to or re-associated with remaining operable devices. In one embodiment, the database 250 is implemented as a distributed database, at which data entries are stored at multiple nodes (e.g., storage machines). By (i) storing the list of tasks at the distributed database and (ii) employing replaceable multiple execution devices 230 and task service devices 240 without a central point of intelligence, the digital magazine server 105 can respond to client requests in a dynamic and scalable way.

In one embodiment, the components in the digital magazine server 105 can be dynamically added, removed or replaced during operation. For example, a new execution device 230 can be added, and be assigned to a new task, or a new task service device 240 can be added and be associated with a new task. For another example, statuses of execution devices 230 are confirmed to ensure successful completion of tasks assigned, where the operation statuses of the execution devices 230 are indicated by the heartbeats of the execution devices 230. In case an execution device 230 is determined to be inoperable (e.g., disconnected, powered down, etc.), tasks assigned to the inoperable execution device 230 are re-assigned to another operable execution device 230. Similarly, statuses of task service devices 240 are indicated by the heartbeats of the task service devices 240. In case a task service device 240 is determined to be inoperable, tasks associated with the inoperable task service device 240 can be re-associated with another operable task service device 240.

The load balancing device 220 is a computing device interfacing among the client devices 110, the task service devices 240, and the execution devices 230. In one embodiment, the load balancing device 220 includes multiple computing machines. The load balancing device 220 receives a task request to perform a task, and associates the task with a corresponding task service device 240. In one aspect, the load balancing device 220 associates the task with a task service device 240 based on requirements specified by the task request. For example, tasks of a particular type (e.g., data compilation) or tasks involved with a particular source device 102 are associated with a predetermined task service device 240 (e.g., task service device 240D). The load balancing device 220 provides the task request to the associated task service device 240. Additionally, the load balancing device 220 forwards communication among the execution devices 230 and the task service devices 240.

Figure 3:
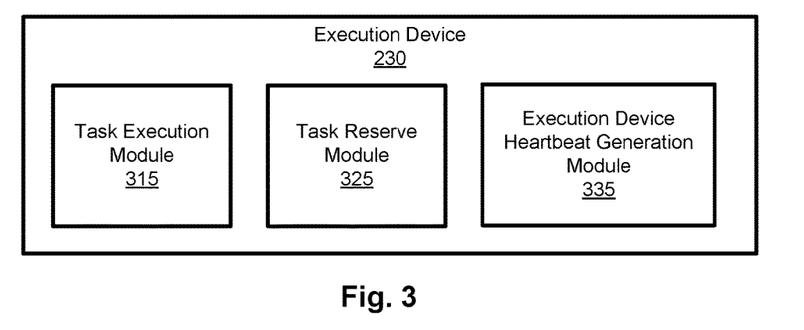
FIG. 3 is a block diagram illustrating an execution device according to one embodiment.

FIG. 3 is a block diagram illustrating an execution device 230 according to one embodiment. The execution device 230 is a computing device for executing one or more tasks assigned to the execution device 230. In one embodiment, the execution device 230 includes a task execution module 315, a task reserve module 325, and an execution device heartbeat generation module 335. In other embodiments, the execution device 230 may include different, fewer, or additional components. For example, the execution device 230 may include a plurality of task execution modules 315.

The task execution module 315 is a processing unit to execute one or more tasks assigned. The task execution module 315 is identified by a unique identification (herein also referred to as a "worker ID"). In case the execution device 230 includes multiple task execution modules 315, each task execution module 315 may execute a different task. In one embodiment, each task execution module 315 is configured to perform a particular task. For example, a first task execution module 315 is to retrieve content items from a source device 102, and a second task execution module 315 is to compile content items from different source device 102 to generate a content page of a customized digital magazine. After completing execution of a task, the task execution module 315 notifies a task service device 240 associated with the task that the task is completed.

The task reserve module 325 is a component that reserves tasks for each task execution module 315. In one embodiment, each task execution device 230 has a list of processing units, e.g., a list of threads. When a processing unit (or task execution module 315) becomes available on the execution device 230, the task reserve module 325 of the execution device 230 requests additional tasks from its associated task service device 240, which finds pending or unassigned tasks for the execution device 230, e.g., based on the type of task that can be executed by the execution device 230 using the available processing unit. The task reserve module 325 transmits, to the task service device 240, timestamps of its availability and capabilities of the task execution modules 315. In addition, the task reserve module 325 transmits a request to reserve an available task (i.e., not assigned task). The request to reserve an available task includes a worker ID to identify which processing unit (e.g., task execution module 315) can execute the task and a timestamp indicating when the task execution module 315 is available for the task. The task reserve module 325 may receive a confirmation of the task assignment from the task service device 240. The confirmation of the task assignment includes an identification of the assigned task and a worker ID.

The execution device heartbeat generation module 335 generates and transmits an execution device heartbeat to indicate the execution device 230 is operable. An execution device heartbeat is an electric representation generated by an execution device 230 to indicate the operation status of the execution device 230, e.g., whether the execution device 230 is functional (i.e., operable). In one embodiment, the execution device heartbeat generation module 335 transmits an execution device heartbeat to task service devices 240 during an execution device heartbeat wait period. In one example, the execution device heartbeat wait period is periodic (e.g., every 10 minutes), during which the operation status of the execution device 230 can be confirmed. During the execution device heartbeat wait period, an operable execution device 230 is expected to generate and transmit an execution device heartbeat to the task service device 240. In response to an absence of an execution device heartbeat during an execution device heartbeat wait period, the task service devices 240 can determine an execution device 230 is inoperable during the execution device heartbeat wait period.

Figure 4:
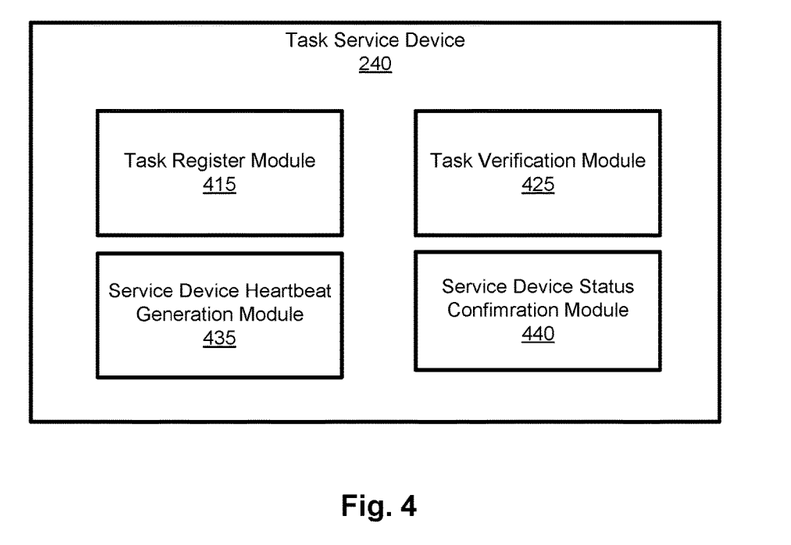
FIG. 4 is a block diagram illustrating a task service device according to one embodiment.

FIG. 4 is a block diagram illustrating the task service device 240 according to one embodiment. The task service device 240 is a computing device for verifying completion of tasks by the various execution devices 230. In one embodiment, the task service device 240 includes a task register module 415, a task verification module 425, a service device heartbeat generation module 435, and a service device status confirmation module 440. In other embodiments, the task service device 240 may include different, fewer, or additional components.

The task register module 415 creates a new task entry at the database 250. Specifically, the task register module 415 receives a task request from the load balancing device 220 and generates a task identification (herein also referred to as a "task ID") for the new task request. The task register module 415 records the task ID at the database 250. The task register module 415 receives a request for a task assignment from one or more execution devices 230, for example, through the load balancing device 220, and the task register module 415 assigns the task to a capable execution device 230 (or a task execution module 315). The task register module 415 can assign the task based on an availability of the task execution module 315, capability of the task execution module 315, and task requirements. The task register module 415 stores the task ID and the worker ID at the database 250.

In one aspect, the task register module 415 receives and processes task requests in various computing platforms, such as various computer programming languages. For example, the task register module 415 can receive task requests from the client device 110 through the load balancing device 220 in Java, Python, C# program languages or in other platforms, and convert the task requests into a unified format. Thus, the task register module 415 can serve requests from various client devices 110 with different platforms.

The task verification module 425 verifies statuses of its associated tasks. In one embodiment, the task verification module 425 determines whether an execution device heartbeat from an execution device 230 is received during an execution device heartbeat wait period associated with the execution device 230. Responsive to an absence of an execution device heartbeat from the execution device 230 during the execution device heartbeat wait period, the task verification module 425 determines that the execution device 230 is inoperable, and releases (or removes) the task ID and the worker ID from the database 250. The task of the released task ID can be re-assigned to a new task execution device 230 upon receiving a request for a task assignment from the new task execution device 230. The task verification module 425 can repeatedly check for the execution device heartbeat during different execution device heartbeat wait periods associated with the execution device 230 until receiving a notification from the execution device 230 (e.g., task execution module 315) that the task is completed. Once receiving a notification that the task is completed, the task verification module 425 may remove the task ID from the database 250.

The service device heartbeat generation module 435 generates a service device heartbeat to indicate the operation status of the task service device 240. A service device heartbeat is an electric representation generated by a task service device 240 indicating the operation status of itself, e.g., whether the task service device 240 is functional. In one embodiment, the service device heartbeat generation module 435 records a service device heartbeat (i.e., indication of its availability) at the database 250 during a service device heartbeat wait period. In one example, the service device heartbeat wait period is periodic (e.g., every 12 hours).

In one embodiment, the service device status confirmation module 440 tracks statuses of other task service devices 240. In one approach, after the service device heartbeat wait period, each task service device 240 can query the database 250 to obtain a list of task service devices 240 scheduled to be operable and a list of task service devices 240 with recorded service device heartbeat to determine inoperable task service devices 240. In one example, a task service device with no record of service device heartbeat during the service device heartbeat wait period can be determined to be inoperable. In case a task service device 240 is determined to be inoperable, tasks associated with the inoperable task service devices 240 can be distributed and re-associated with the remaining operable task service devices 240.

Figure 5:
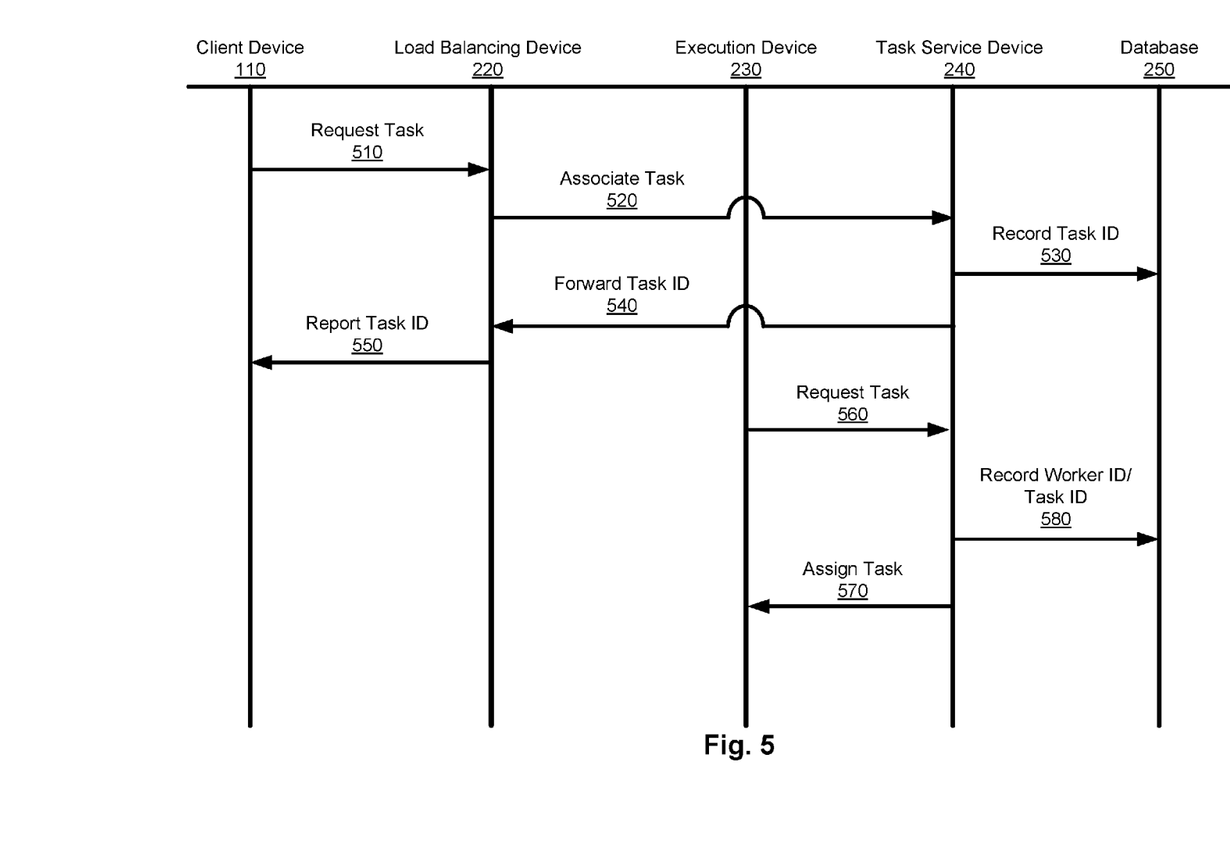
FIG. 5 is an interaction diagram illustrating a process of assigning a task to an execution device according to one embodiment.

FIG. 5 is an interaction diagram illustrating a process of assigning a task to an execution device 230, according to one embodiment. The client device 110 requests 510 a task to be performed to the load balancing device 220.

The task request specifies an identification of the client device 110 requesting the task, a type of task (e.g., data crawling, content time analysis, etc.), a source device, time requirement (e.g., ETA), frequency, etc.

The load balancing device 220 receives the task request, and associates 520 the task with a task service device 240. In one aspect, the load balancing device 220 identifies the task service device 240 based on the requirements specified by the task request (e.g., source device, time requirement, etc.). In another aspect, the load balancing device 220 identifies the task service device 240 with the most available resources (e.g., processor threads), or with the fewest number of tasks associated. The load balancing device 220 associates the task request with the identified task service device 240, and provides the task request to the associated task service device 240.

The task service device 240 receives the task request, and generates a task ID. The task service device 240 records 530 the task ID at the database 250. The task service device 240 forwards 540 the task ID to the load balancing device 220, and the load balancing device 220 can report 550 the task ID to the client device 110. In other embodiments, the steps of 540 and 550 can be omitted.

When the execution device 230 becomes available or is scheduled to be available in a predetermined time period, the execution device 230 transmits 560 a request for a task assignment. In one embodiment, the request for the task assignment includes a worker ID identifying an available task execution module (or a processing unit). Responsive to the request, the task service device 240 records 580 the worker ID and the task ID in the database 250, and assigns 570 the task identified by the task ID to the execution device 230.

Figure 6A:
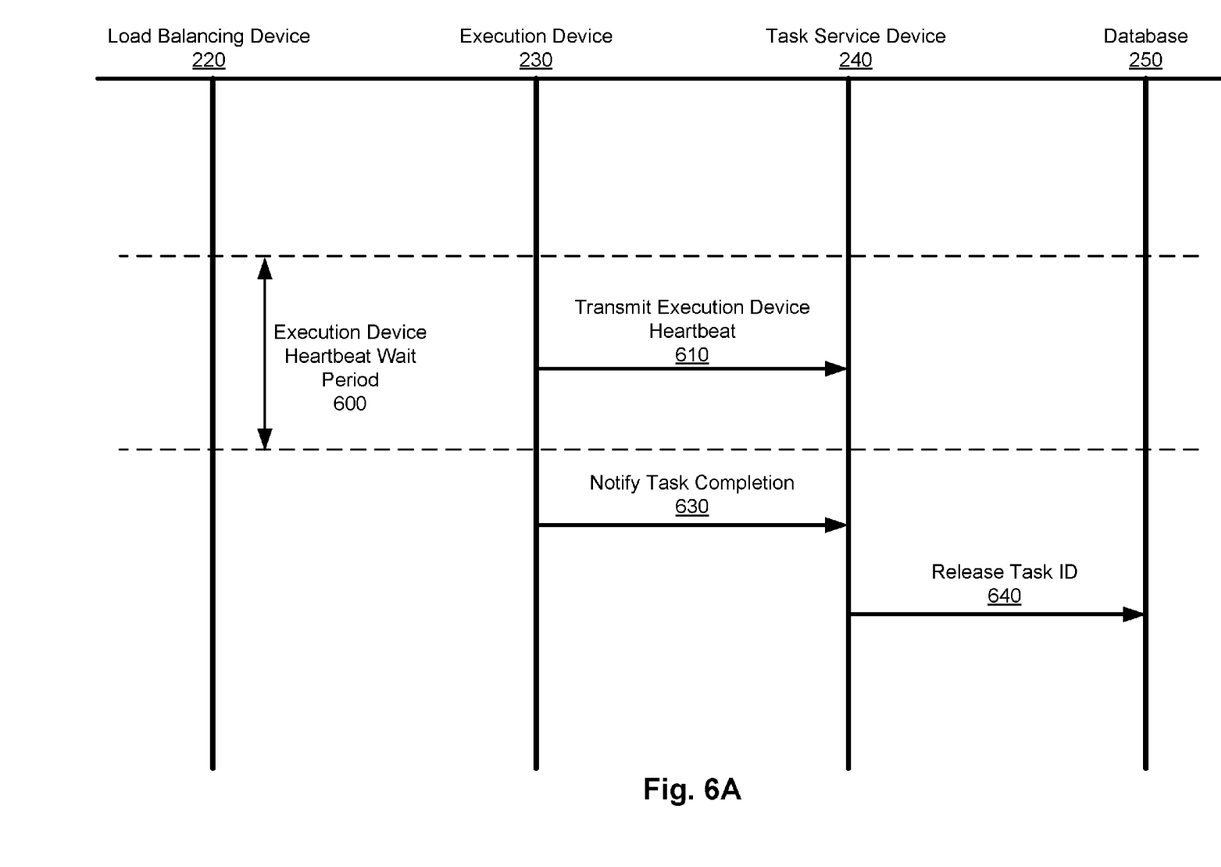
FIG. 6A is an interaction diagram illustrating a process of verifying a task performed by an execution device according to one embodiment.

FIG. 6A is an interaction diagram illustrating a process of verifying a task performed by an execution device 230 according to one embodiment.

The execution device 230 assigned to a task transmits 610 an execution device heartbeat to a task service device 240 associated with the task during an execution device heartbeat wait period 600. The execution device heartbeat is an electric representation generated by an execution device 230 to indicate that the execution device 230 is functional. In response to the task service device 240 receiving the execution device heartbeat during the execution device heartbeat wait period 600, the task service device 240 confirms that the execution device 230 is operable. Although a single execution device heartbeat wait period 600 is shown in FIG. 6, the task service device 240 may confirm a status of the execution device 230 during multiple execution device heartbeat wait periods 600 periodically.

After successfully completing the task, the execution device 230 notifies 630 the task service device 240 that the task is completed. Responsive to the notification of completion of the task from the execution device 230, the task service device 240 releases 640 the task ID of the task from the database 250. For example, the task service device 240 may delete the task ID from the database 250. Alternatively, the task service device 240 may reschedule a task to be re-performed at a later time.

Figure 6B:
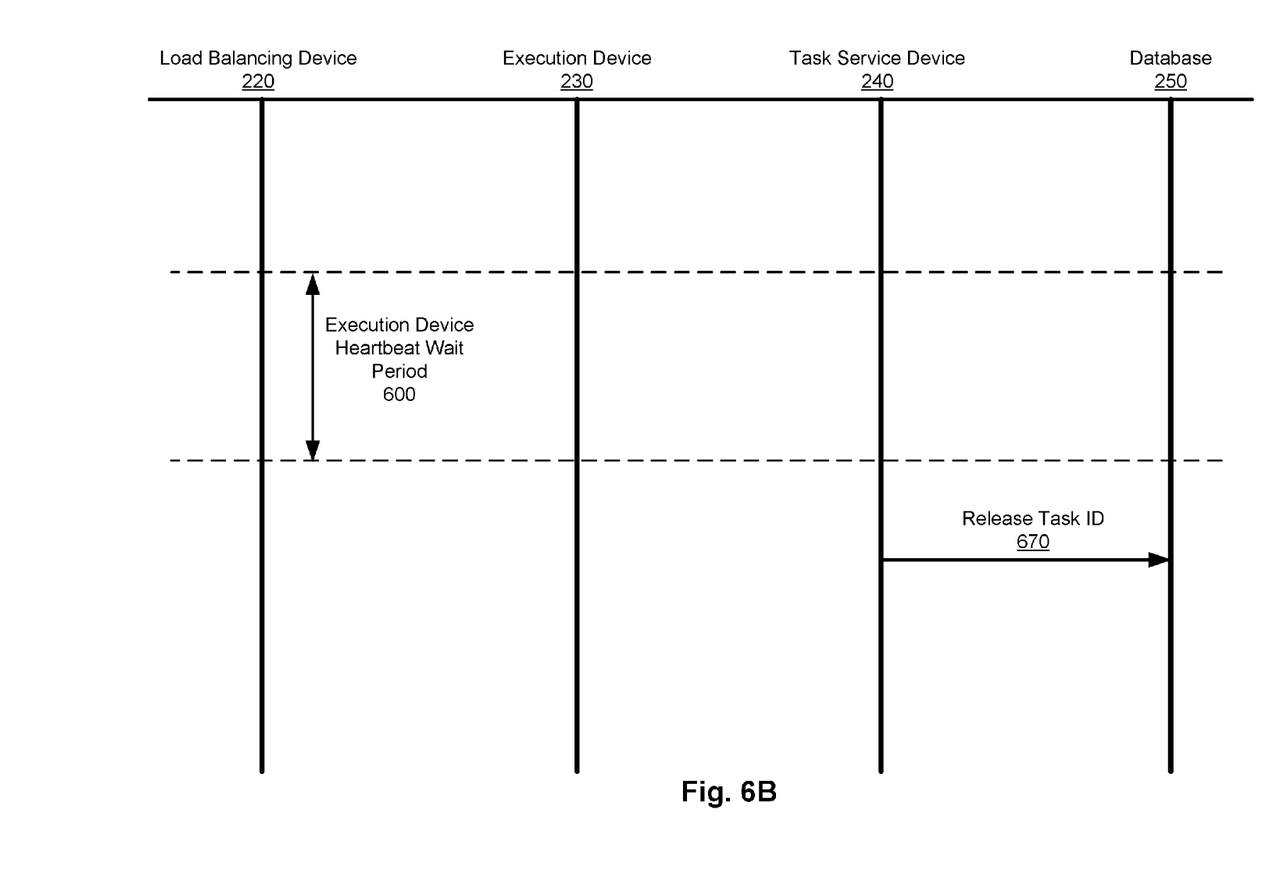
FIG. 6B is an interaction diagram illustrating a process of determining an execution device being inoperable according to one embodiment.

FIG. 6B is an interaction diagram illustrating a process of determining an execution device 230 being inoperable, according to one embodiment.

As illustrated in FIG. 6B, the task service device 240 does not receive any execution device heartbeat during the execution device heartbeat wait period 600. Hence, the task service device 240 determines that the execution device 230 assigned to a task is not operable, and releases 670 the task ID from the database 250. The released task becomes available for a re-assignment.

Figure 7:
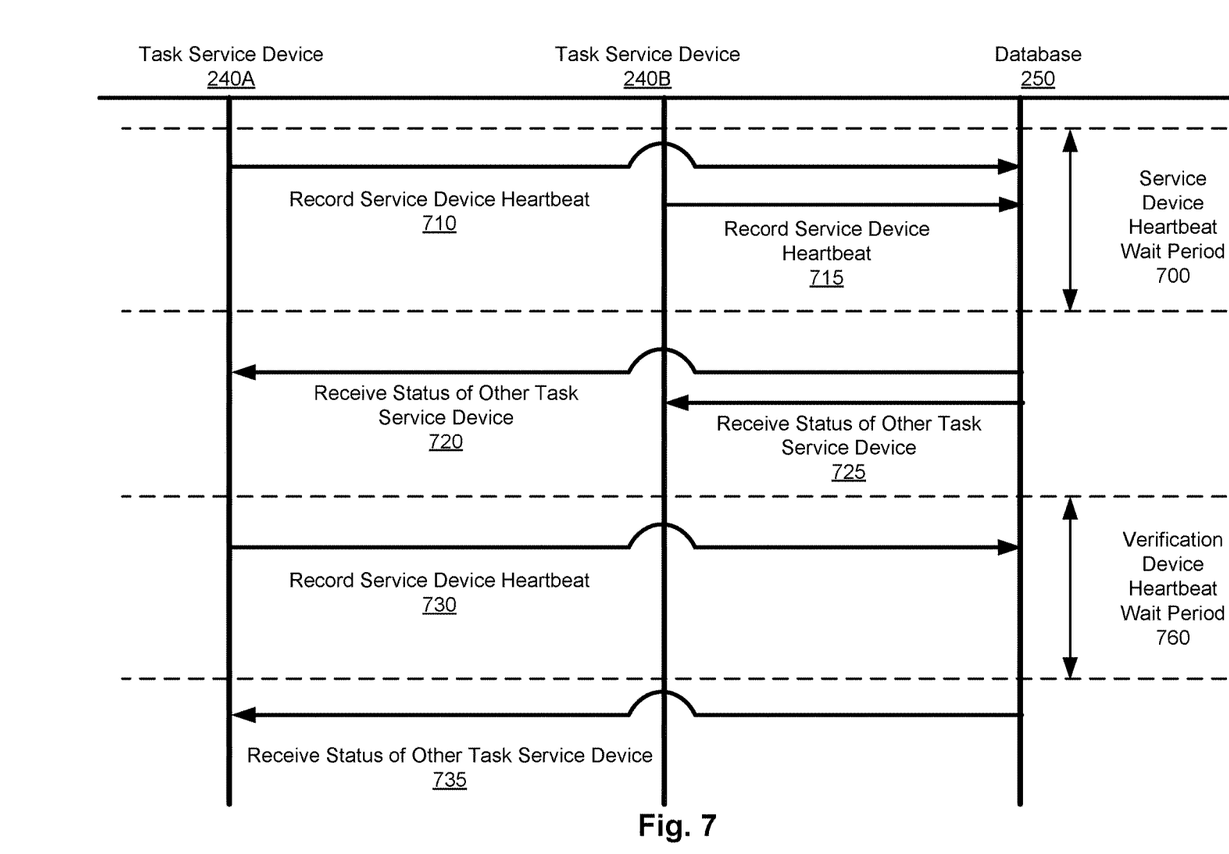
FIG. 7 is an interaction diagram illustrating a process of determining statuses of task service devices according to one embodiment.

FIG. 7 is an interaction diagram illustrating a process of determining statuses of task service devices according to one embodiment. In this example shown in FIG. 7, the two task service devices 240A and 240B and the database 250 are shown.

During a service device heartbeat wait period 700, each of the task service devices 240A and 240B records a service device heartbeat of the corresponding task service device 240A or 240B. A service device heartbeat is an electric representation generated by a task service device 240 to indicate that the task service device 240 is functional. In one embodiment, the task service devices 240 record 710, 715 their availabilities (e.g., service device heartbeats) at the database 250. After the service device heartbeat wait period 700, each of the task service devices 240 confirms a status of the other task service device 240. In one embodiment, the task service device 240A queries the database 250 to receive 720 the status of the task service device 240B, and the task service device 240B queries the database 250 to receive 725 the status of the task service device 240A. Specifically, the database 250 provides a list of task service devices 240 and a list of task service devices that recorded their availabilities (e.g., service device heartbeats). By comparing the list of task service devices 240 and the list of task service devices recorded their availabilities, the task service device 240 can determine an availability of other task service devices 240.

During another service device heartbeat wait period 760, the task service device 240A records 730 its availability, but the task service device 240B does not. Hence, in this example, only the service device heartbeat of the task service device 240A is recorded at the database 250 during the service device heartbeat wait period 760. The task service device 240A queries 735 the database 250 to receive statuses of other task service devices, and determines that the task service device 240B did not record its availability. Thus, the task service device 240 determines the task service device 240B is inoperable, and re-associates tasks, previously associated with the task service device 240B, with the task service device 240A. Although there is only one operable task service device 240A shown in FIG. 7 after the service device heartbeat wait period 760, in other examples, there may be multiple task service devices 240 operable after the task service device 240B becomes inoperable. In such a case, tasks previously associated with the task service device 240B may be distributed among the operable task service devices 240.

Figure 8:
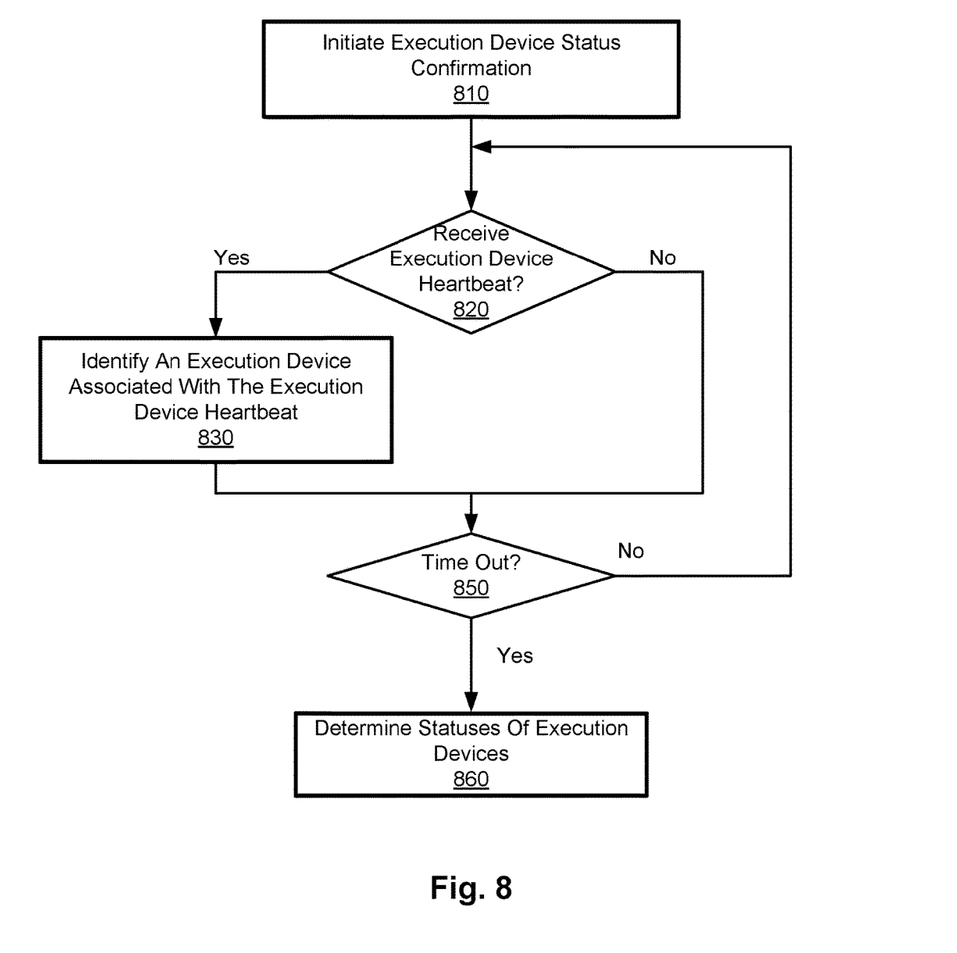
FIG. 8 is a flow chart illustrating a process of monitoring statuses of the execution devices according to one embodiment.

FIG. 8 is a flow chart illustrating a process of monitoring statuses of the execution devices 230 according to one embodiment. In the embodiment illustrated in FIG. 8, statuses of the execution devices 230 are determined according to corresponding execution device heartbeats by a task service device 240. In other embodiments, some or all of the steps in FIG. 8 can be performed by other entities.

The task service device 240 initiates 810 an execution device status confirmation process. In one embodiment, the task service device 240 performs an execution device status confirmation periodically during an execution device heartbeat wait period. The task service device 240 initiates the execution device status confirmation process at a beginning of the execution device heartbeat wait period. During the execution device heartbeat wait period, each of operable execution devices 230 is configured to transmit an execution device heartbeat. In one aspect, the execution device heartbeat includes an identification of an execution device or an identification of a processing unit (e.g., worker ID) to indicate a source of the execution device heartbeat.

The task service device 240 determines 820 whether an execution device heartbeat is received or not. Responsive to receiving an execution device heartbeat from an execution device 230, the task service device 240 identifies 830 the execution device 230 associated with the execution device heartbeat. Specifically, the task service device 240 can determine the source of the received execution device heartbeat based on the identification included in the execution device heartbeat.

The task service device 240 determines 850 whether the execution device heartbeat wait period is over. The task service device 240 repeats the steps 820 and 830 until the execution device heartbeat wait period is over. Once the execution device heartbeat wait period is over, the task service device 240 determines 860 statuses of the execution devices 230. The task service device 240 records statuses of the execution devices 230 at the database 250.

In one embodiment, the task service device 240 obtains an execution device schedule list identifying execution devices 230 that are operable. The task service device 240 confirms one or more execution devices 230 identified in the step 830 during the execution device heartbeat wait period are still operable, and determines that the remaining one or more execution devices 230 not identified in the step 830 during the execution device heartbeat wait period are inoperable. The task service device 240 generates a confirmed execution device list identifying operable execution devices 230 identified in the step 830 during the execution device heartbeat wait period, and generates an unconfirmed execution device list identifying inoperable execution devices 230 by identifying execution devices included in the execution device schedule list but not in the confirmed execution device list. The task service device 240 may record the unconfirmed execution device list without the confirmed execution device list, or record both lists at the database 250. Responsive to identifying one or more inoperable execution devices 230, the task service device 240 can release tasks assigned to the inoperable execution devices 230 in the database entry of the database 250 for reassignment.

Figure 9:
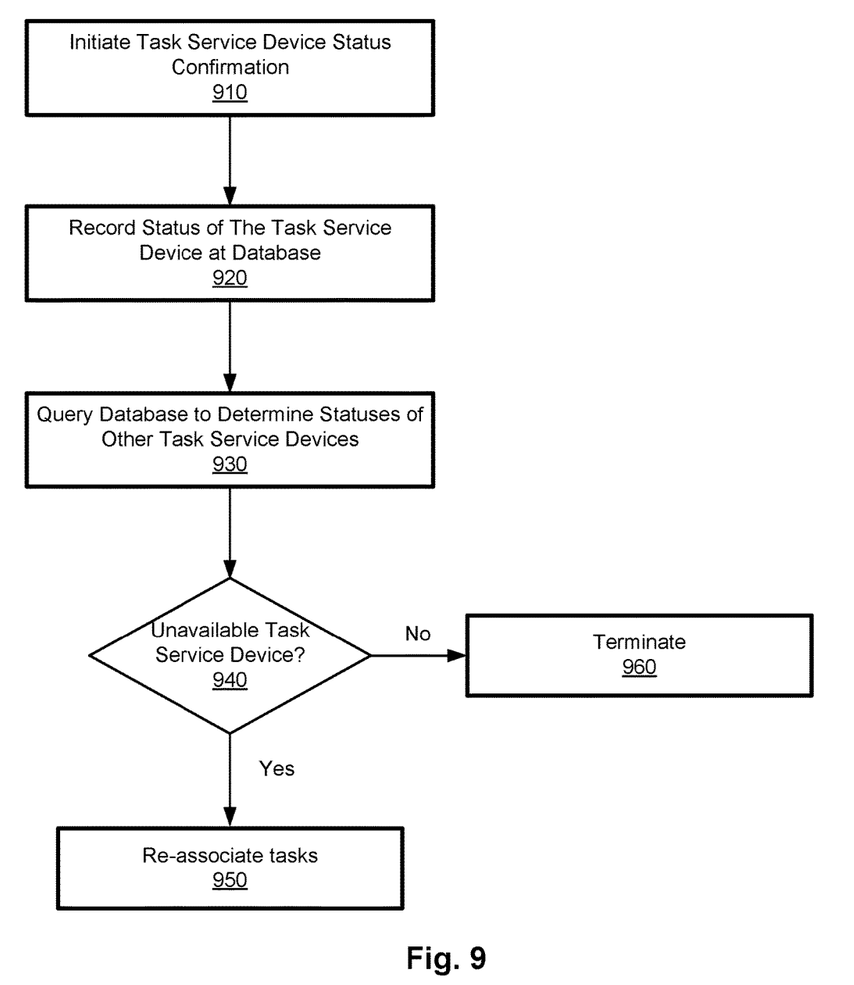
FIG. 9 is a flow chart illustrating a process of monitoring statuses of the task service devices according to one embodiment.

FIG. 9 is a flow chart illustrating a process of monitoring statuses of the task service devices 240 according to one embodiment. In the embodiment illustrated in FIG. 9, statuses of the task service devices 240 are determined according to service device heartbeats by the service device status confirmation module 440 of the task service device 240. In other embodiments, some or all of the steps in FIG. 9 can be performed by other devices. Although the steps in FIG. 9 are illustrated as a single task service device 240 determining statuses of other task service devices 240, other task service devices 240 can perform the same steps concurrently.

The task service device 240 initiates 910 a task service device status confirmation process. In one embodiment, the task service device 240 performs the task service device status confirmation periodically during a service device heartbeat wait period. The task service device 240 initiates the task service device status confirmation process at a beginning of the service device heartbeat wait period. During the service device heartbeat wait period, each of operable task service devices 240 is configured to record 920 its status at the database 250.

The task service device 240 queries 930 the database 250 to determine 940 statuses of other task service devices 240. In one embodiment, the task service device 240 queries the database 250 after the service device heartbeat wait period. Responsive to determining an inoperable task service device 240, tasks assigned to the inoperable task service device 240 can be re-associated 950 with the remaining task service devices 240. Assuming for an example six tasks were associated with the inoperable task service device with three operable task service devices remaining, each of the three operable task service devices can be associated with different two tasks of the six tasks. Responsive to determining that all task service devices 240 are operable (i.e., no inoperable task service devices), the task service device status confirmation process can be terminated 960. In one embodiment, the task service device status confirmation process can be performed periodically.

Advantageously, the digital magazine server 105 disclosed herein performs task assignment, execution, and verification of completion of tasks through various components in a distributed manner without a central intelligence in a scalable and dynamic manner. Therefore, a single point of failure can be avoided. Accordingly, the digital magazine server 105 can execute all tasks successfully, even when any component in the digital magazine server 105 is dynamically added, removed, or replaced during operation.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A digital magazine server system for distributing a plurality of tasks associated with presenting a digital magazine to a client device, the digital magazine server system comprising:
a plurality of execution devices, each of the plurality of execution devices assigned to one or more tasks of a plurality of tasks associated with presenting the digital magazine, a task assigned to an execution device based on a type of the task and one or more characteristics of the task identified in a task request identifying the task, wherein, for each of the tasks being executed, an execution device assigned to execute the task is configured to generate an execution device heartbeat indicating that the execution device is operable for the task; and
a plurality of task service devices, each of the task service devices of a plurality of task service devices configured to verify statuses of the tasks assigned to the plurality of the execution devices, wherein each of the plurality of task service devices is configured to generate a service device heartbeat indicating that the task service device is operable for an associated task, and wherein a task service device of the plurality of task service devices associated with a task is configured to determine that an execution device assigned to execute the task is operable based on the execution device heartbeat associated with the execution device during an execution device heartbeat wait period, wherein each of the task service device is further configured to determine whether the other task service devices are operable based on service device heartbeats associated with the other task service devices.

2. The digital magazine server system of claim 1, wherein, the task service device is further configured to determine that an execution device assigned to execute a task associated with the task service device is inoperable based on an absence of an execution device heartbeat associated with the execution device during the execution device heartbeat wait period.

3. The digital magazine server system of claim 2, wherein the task service device is configured to reassign the task assigned to the inoperable execution device to another operable execution device.

4. The digital magazine server system of claim 1, wherein, each of the task service devices is configured to record its service device heartbeat at a database during a service device heartbeat wait period, and wherein the task service device is further configured to determine that another task service device is inoperable based on no record of service device heartbeat associated with the another task service device at the database.

5. The digital magazine server system of claim 4, wherein remaining operable task service devices are configured to distribute tasks associated with the inoperable task service device, and to re-associate the distributed tasks with themselves.

6. The digital magazine server system of claim 1, further comprising:
a distributed database for storing the plurality of tasks associated with presenting the digital magazine,
wherein, for each of the plurality of tasks, the associated task service device is configured to store an identification of the task and an identification of the execution device assigned to execute the task at the distributed database.

7. The digital magazine server system of claim 6, wherein the associated task service device is configured to remove, from the distributed database, an identification of a completed task and an identification of an execution device completing the task.

8. The digital magazine server system of claim 1, further comprising a load balancing device, the load balancing device configured to:
receive a request to perform a task of the plurality of tasks from the client device,
identify a corresponding task service device of the plurality of task service devices, and
associate the task requested to be performed with the corresponding task service device.

9. The digital magazine server system of claim 8, wherein the corresponding task service device is configured to:

receive the request to perform the task from the load balancing device, generate an identification of the task requested to be performed, and store the identification of the task at a database.

10. The digital magazine server system of claim 9, wherein an execution device is configured to transmit a request for a task assignment, wherein the corresponding task service device is configured to receive the request for the task assignment and assigns the task to the execution device.

11. The digital magazine server system of claim 10, wherein the corresponding task service device is further configured to store the identification of the task and an identification of the execution device assigned to the task.

12. A method for distributing a plurality of tasks associated with presenting a digital magazine to a client device, the method comprising:

receiving a plurality of task requests from one or more client devices, each task request identifying a task associated with presenting the digital magazine, a type of the task, and one or more characteristics of the task;

associating, by a load balancing device, each of a plurality of tasks associated with the presenting the digital magazine with a corresponding one of a plurality of task service devices, the task associated with a corresponding task service device based on the type of the task and the one or more characteristics of the task identified in the task request identifying the task;

assigning, by the plurality of task service devices, each of the plurality of tasks to a corresponding one of a plurality of execution devices;

executing, by each of the plurality of execution devices, one or more assigned tasks of the plurality of tasks;

generating, by each of the execution devices, an execution device heartbeat indicating that the execution device is operable for an assigned task;

verifying, by the plurality of task service devices, statuses of the tasks assigned to the plurality of execution devices by:

determining, by a task service device of the plurality of task service devices associated with a task, that an execution device assigned to execute the task is operable based on the execution device heartbeat associated with the execution device during an execution device heartbeat wait period;

recording, by each of the task service devices, its status at a database during a service device heartbeat wait period; and determining, by each of the task service devices, statuses of other task service devices based on service device heartbeats associated with the other task service devices.

13. The method of claim 12, wherein verifying, by the plurality of task service devices, statuses of the tasks further comprises:

determining, by the task service device, that an execution device assigned to execute a task associated with the task service device is inoperable based on an absence of an execution device heartbeat associated with the execution device during the execution device heartbeat wait period.

14. The method of claim 12, wherein determining, by each of the task service devices, the statuses of the other task service devices further comprises:

determining, by the task service device, that another task service device is inoperable based on no record of service device heartbeat associated with the another task service device at the database.

15. The method of claim 14, further comprising:

distributing, by remaining task service devices, tasks associated with the inoperable task service device; and re-associating, by the remaining task service devices, the distributed tasks with themselves.

16. The method of claim 12, further comprising:

receiving, by a load balancing device, a request to perform a task of the plurality of tasks from the client device, identifying, by the load balancing device, a corresponding task service device of the plurality of task service devices, and associating, by the load balancing device, the task requested to be performed with the corresponding task service device.

17. The method of claim 16, further comprising:

receiving, by the corresponding task service device, the request to perform the task from the load balancing device, generating, by the corresponding task service device, an identification of the task requested to be performed, and storing, by the corresponding task service device, the identification of the task at the database.

18. The method of claim 17, further comprising:

receiving, by the corresponding task service device, a request for a task assignment from an execution device; and assigning, by the corresponding task service device, the task to the execution device.

19. The method of claim 18, further comprising:

storing, by the corresponding task service device, the identification of the task and an identification of the execution device assigned to the task.

20. A non-transitory computer-readable storage medium storing executable computer program instructions for distributing a plurality of tasks associated with presenting a digital magazine to a client device, the computer program instructions when executed by a computer processor cause the computer processor to:

receive a plurality of task requests from one or more client devices, each task request identifying a task associated with presenting the digital magazine, a type of the task, and one or more characteristics of the task;

associate, by a load balancing device, each of a plurality of tasks associated with the presenting the digital magazine with a corresponding one of a plurality of task service devices, the task associated with a corresponding task service device based on the type of the task and the one or more characteristics of the task identified in the task request identifying the task;

assign, by the plurality of task service devices, each of the plurality of tasks to a corresponding one of a plurality of execution devices;

execute, by each of the plurality of execution devices, one or more assigned tasks of the plurality of tasks;

generate, by each of the execution devices, an execution device heartbeat indicating that the execution device is operable for an assigned task;

verify, by the plurality of task service devices, statuses of the tasks assigned to the plurality of execution devices by:

determine, by a task service device of the plurality of task service devices associated with a task, that an execution device assigned to execute the task is operable based on the execution device heartbeat associated with the execution device during an execution device heartbeat wait period;

record, by each of the task service devices, its status at a database during a service device heartbeat wait period; and determine, by each of the task service devices, statuses of other task service devices based on service device heartbeats associated with the other task service devices.

* * * * *